United States Patent
Kubota

(10) Patent No.: US 9,201,224 B2
(45) Date of Patent: Dec. 1, 2015

(54) PROJECTOR ZOOM LENS AND PROJECTOR

(71) Applicant: Takashi Kubota, Suginami-ku (JP)

(72) Inventor: Takashi Kubota, Suginami-ku (JP)

(73) Assignee: RICOH COMPANY, LTD., Tokyo (JP)

(*) Notice: Subject to any disclaimer, the term of this patent is extended or adjusted under 35 U.S.C. 154(b) by 142 days.

(21) Appl. No.: 13/973,501

(22) Filed: Aug. 22, 2013

(65) Prior Publication Data

US 2014/0063612 A1    Mar. 6, 2014

(30) Foreign Application Priority Data

Sep. 3, 2012 (JP) ................. 2012-193560

(51) Int. Cl.
*G02B 15/14* (2006.01)
*G02B 15/177* (2006.01)

(52) U.S. Cl.
CPC .............. *G02B 15/14* (2013.01); *G02B 15/177* (2013.01)

(58) Field of Classification Search
CPC .............................. G02B 15/14; G02B 15/177
USPC .......................................... 359/761, 782, 770
See application file for complete search history.

(56) References Cited

U.S. PATENT DOCUMENTS

| 4,585,314 | A * | 4/1986 | Tateoka ................ 359/761 |
| 7,259,801 | B2 * | 8/2007 | Conner et al. ............ 348/744 |
| 2006/0109564 | A1 | 5/2006 | Sawamoto |
| 2007/0058267 | A1 | 3/2007 | Kawana |
| 2010/0053737 | A1 | 3/2010 | Fujita et al. |
| 2011/0128637 | A1 | 6/2011 | Kubota |
| 2011/0310496 | A1 | 12/2011 | Kubota et al. |
| 2011/0317285 | A1 | 12/2011 | Ohashi et al. |
| 2012/0147485 | A1 | 6/2012 | Kubota |

FOREIGN PATENT DOCUMENTS

| CN | 101071197 A | 11/2007 |
| CN | 101206303 A | 6/2008 |
| CN | 101311767 A | 11/2008 |
| CN | 101344635 A | 1/2009 |
| CN | 101581826 A | 11/2009 |
| JP | 2007-079107 | 3/2007 |
| JP | 2010-085973 | 4/2010 |

(Continued)

OTHER PUBLICATIONS

U.S. Appl. No. 13/893,586, filed May 14, 2013.

(Continued)

*Primary Examiner* — Scott J Sugarman
*Assistant Examiner* — Vipin Patel
(74) *Attorney, Agent, or Firm* — Oblon, McClelland, Maier & Neustadt, L.L.P.

(57) ABSTRACT

A projector zoom lens includes a first lens group having a negative refractive power and a second lens group having a positive refractive power. The first lens group includes a first front group having a negative refractive power and a first rear group having a positive refractive power, including a positive meniscus lens with a convex surface on an enlargement side. The second lens group includes a second front group having a positive refractive power, including two continuously arranged positive lenses made from a same glass material and having a same surface profile and a second rear group having a negative refractive power, including a biconcave lens and a biconvex lens, the lenses of the first and second lens groups being arranged in order from an enlargement side to a reduction side.

8 Claims, 11 Drawing Sheets

(56) References Cited

FOREIGN PATENT DOCUMENTS

| | | |
|---|---|---|
| JP | 2010-113150 | 5/2010 |
| JP | 4700953 | 3/2011 |

OTHER PUBLICATIONS

Office Action issued Jun. 15, 2015 in Chinese Patent Application No. 201310556572.3 (with English translation).

* cited by examiner

PROJECTOR ZOOM LENS AND PROJECTOR

CROSS REFERENCE TO RELATED APPLICATION

The present application is based on and claims priority from Japanese Patent Application No. 2012-193560, filed on Sep. 3, 2012, the disclosure of which is hereby incorporated by reference in its entirety.

BACKGROUND OF THE INVENTION

1. Field of the Invention

The present invention relates to a projector zoom lens and a projector incorporating this projector zoom lens.

2. Description of the Related Art

A front-projection type projector has been widely used nowadays for business presentation or educational purposes in school to project an enlarged image on a screen ahead of the device.

An image display element called light bulb displays an enlarged projected image. Various types such as a liquid crystal panel are now available.

In recent years micromirror devices as a light bulb represented by a digital micromirror device (DMD) have received great attention. It is preferable for a projector zoom lens to be applicable to various types of light bulbs.

In the micromirror device micromirrors are arranged in arrays and they are selectively inclined for image display. The inclination angle of the micro mirrors is about ±10 degrees. By changing the inclination angle, valid reflective light and invalid reflective light are switched. A light source for the micromirror device needs to be provided adjacent to the projector zoom lens so that the lens diameter of the projector zoom lens near the light bulb has to be small. Further, a long back focus is required.

Despite these limitations, the micromirror device is advantageous in downsizing and higher brightness and will be in widespread use.

The projector zoom lens mounted in the projector is required to correct various aberrations, to exert a large zoom ratio, and to be compact in size at low price.

Japanese Patent Application Publication No. 2007-79107 (Reference 1), No. 2010-113150 (Reference 2), and Japanese Patent No. 4700953 (Reference 3) disclose such projector zoom lenses, for example.

The projector zoom lens in Reference 1 is high in zoom ratio of 1.3× and can correct various aberrations properly. However, it is comprised of 11 to 12 lenses and there is room for improvement in terms of compactness and lower price. With cost increases for lens materials or processing taken into account, it is important to reduce the total number of lens elements for the purpose of cost reduction of the projector zoom lens.

Further, the projector zoom lenses disclosed in References 2 and 3 are made up of 5 lenses and 7 lenses, respectively. However, the zoom ratios thereof are as low as 1.05 to 1.2×. Also, aberrations cannot be corrected sufficiently.

SUMMARY OF THE INVENTION

An object of the present invention is to provide a compact-size projector zoom lens at low price which is adaptable to various types of light bulbs, has a high zoom ratio, and corrects aberrations appropriately, as well as to provide a projector incorporating such a projector zoom lens.

According to one aspect of the present invention, a projector zoom lens comprises a first lens group having a negative refractive power, comprising a first front group having a negative refractive power and a first rear group having a positive refractive power, comprising a positive meniscus lens with a convex surface on an enlargement side; and a second lens group having a positive refractive power, comprising a second front group having a positive refractive power, comprising two continuously arranged positive lenses made from a same glass material and having a same surface profile and a second rear group having a negative refractive power, comprising a biconcave lens and a biconvex lens, the lenses of the first and second lens groups being arranged in order from an enlargement side to a reduction side, in which the projector zoom lens is comprised of 8 lenses or less, lens diameters of the first front group, first rear group, second front group, and second rear group are decreased stepwise from a most enlargement-side lens to a most reduction-side lens, and when zooming from a wide-angle end to a telephoto end, the first lens group is moved towards a reduction side while the second lens group is moved towards an enlargement side.

BRIEF DESCRIPTION OF THE DRAWINGS

Features, embodiments, and advantages of the present invention will become apparent from the following detailed description with reference to the accompanying drawings.

DETAILED DESCRIPTION OF THE PREFERRED EMBODIMENTS

Figure 1:
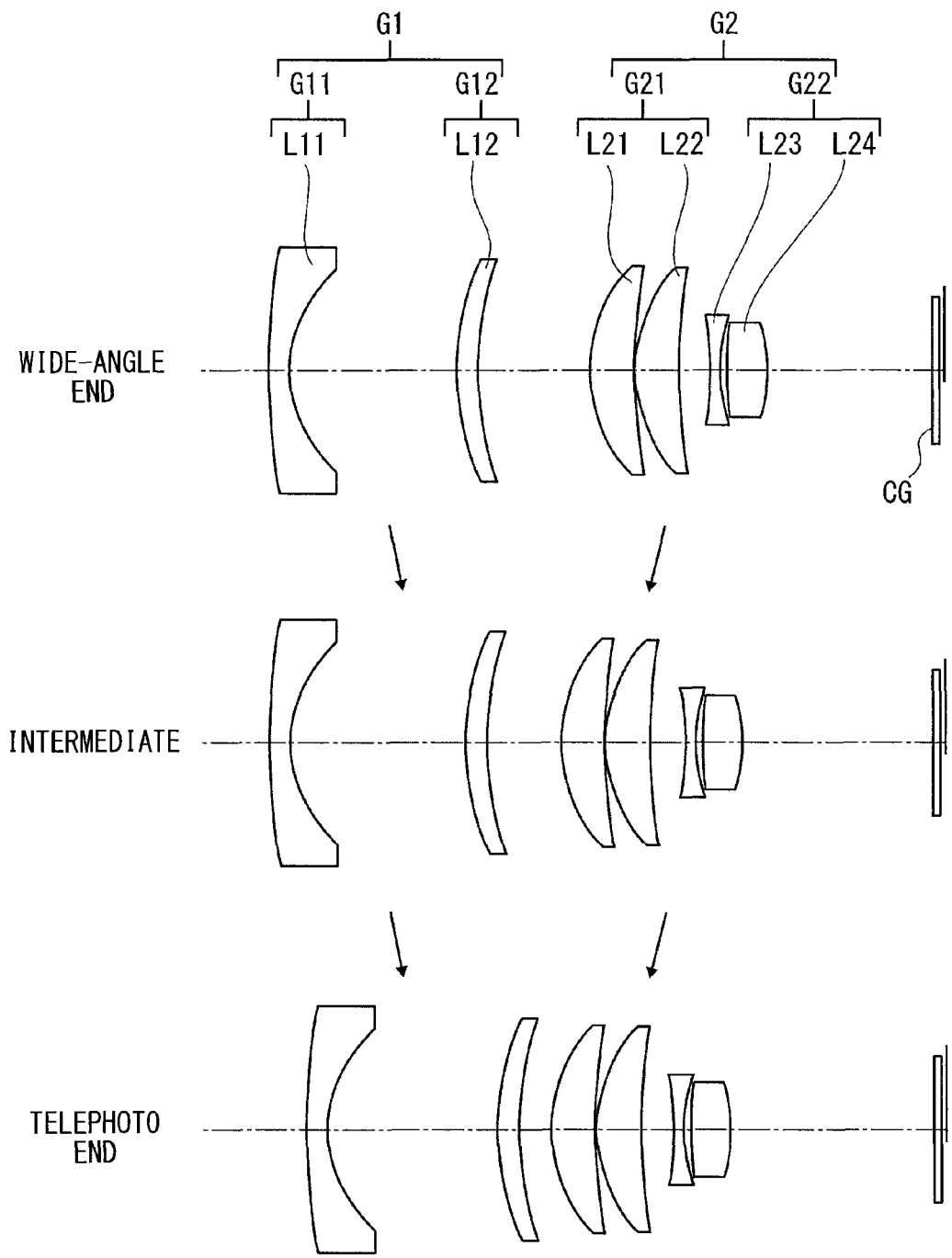
FIG. 1 shows an example of the structure of a projector zoom lens according to a first embodiment.

Hereinafter, embodiments of a projector zoom lens, an image reader and an image forming device will be described in detail with reference to the accompanying drawings. Wherever possible, the same reference numbers will be used throughout the drawings to refer to the same or like parts.

FIG. 1 to FIG. 5 show, from top to bottom, the lens arrangements of projector zoom lenses according to first to fifth embodiments at wide-angle end, intermediate focal length, and telephoto end, respectively. In the drawings the left side is an enlargement side while the right side is a reduction side. The first and second lens groups G1, G2 move in the directions indicated by the arrows in zooming from the wide-angle end to the telephoto end. The code CG denotes a cover glass of an image display element as light bulb.

The projector zoom lenses each comprise a first lens group G1 including a first front group G11 and a first rear group G12, and a second lens group G2 including a second front group G21 and a second rear group G22 arranged in this order from the enlargement side to reduction side.

Herein, a light bulb is assumed to be a micromirror device, however, it should not be limited thereto.

The first lens group G1 has a negative refractive power while the second lens group G2 has a positive refractive power.

The first front group G11 has a negative refractive power and the first rear group G12 has a positive refractive power.

The second front group G21 has a positive refractive power while the second rear group G22 has a negative refractive power.

Figure 2:
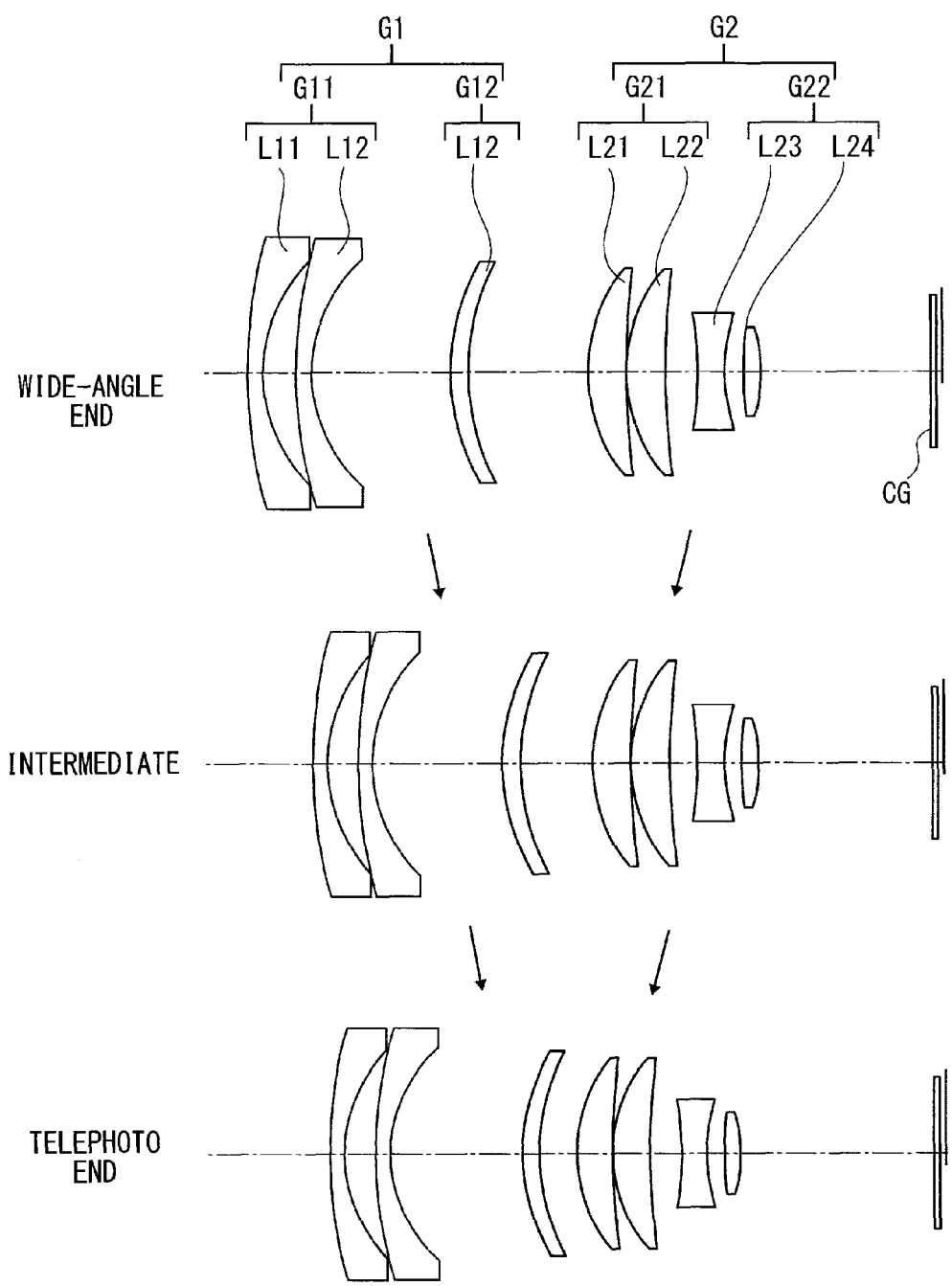
FIG. 2 shows an example of the structure of a projector zoom lens according to a second embodiment.
Figure 3:
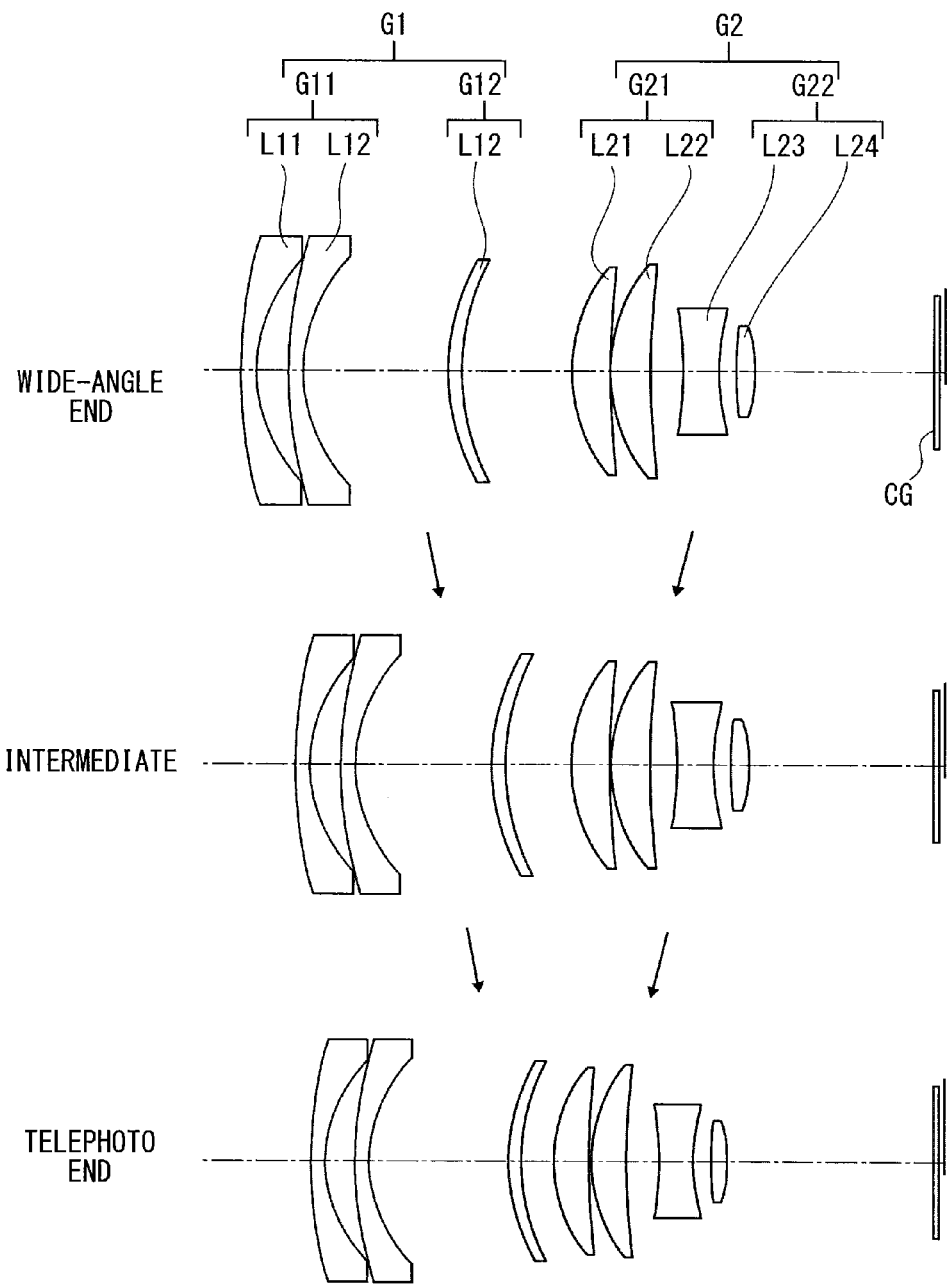
FIG. 3 shows an example of the structure of a projector zoom lens according to a third embodiment.
Figure 4:
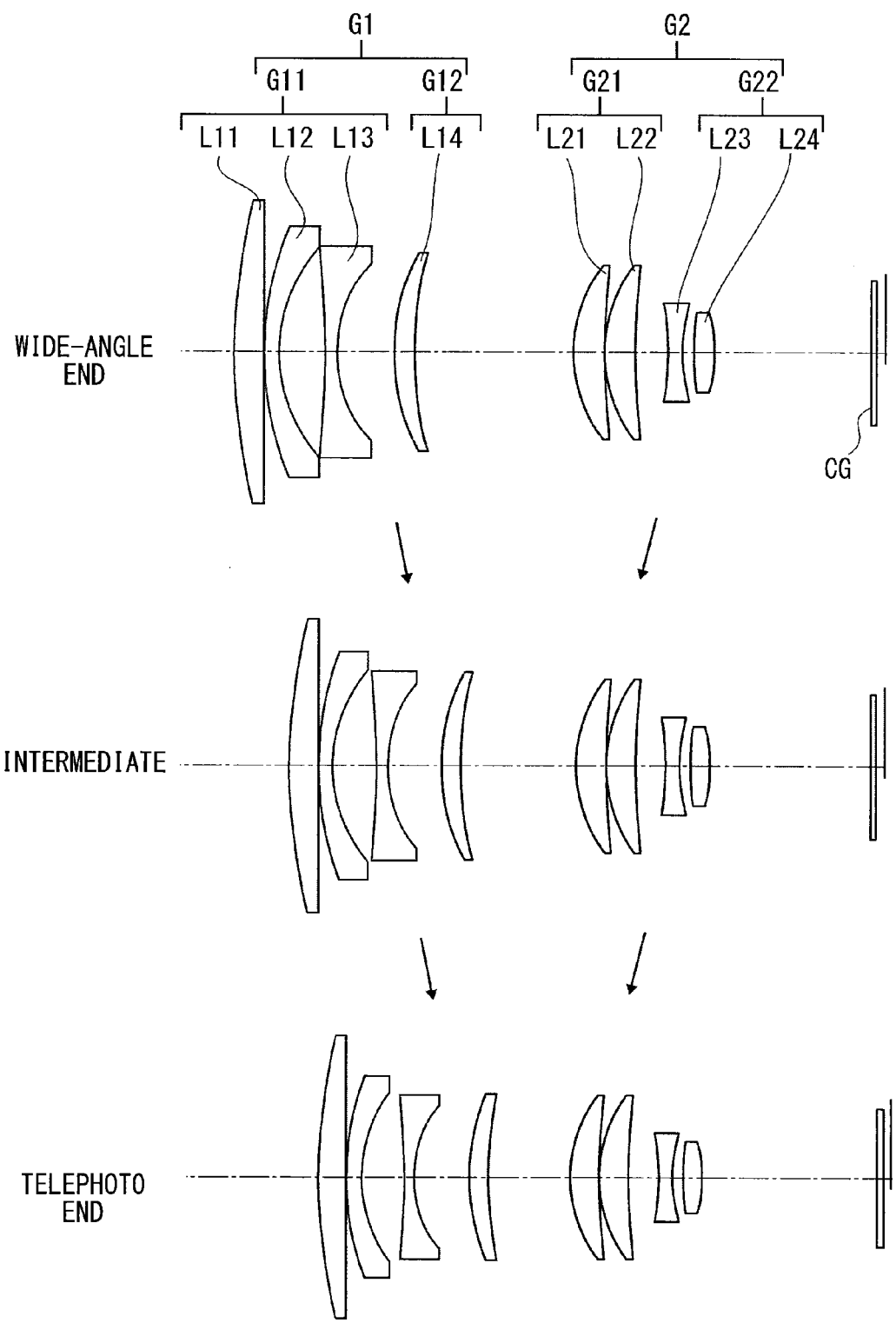
FIG. 4 shows an example of the structure of a projector zoom lens according to a fourth embodiment.
Figure 5:
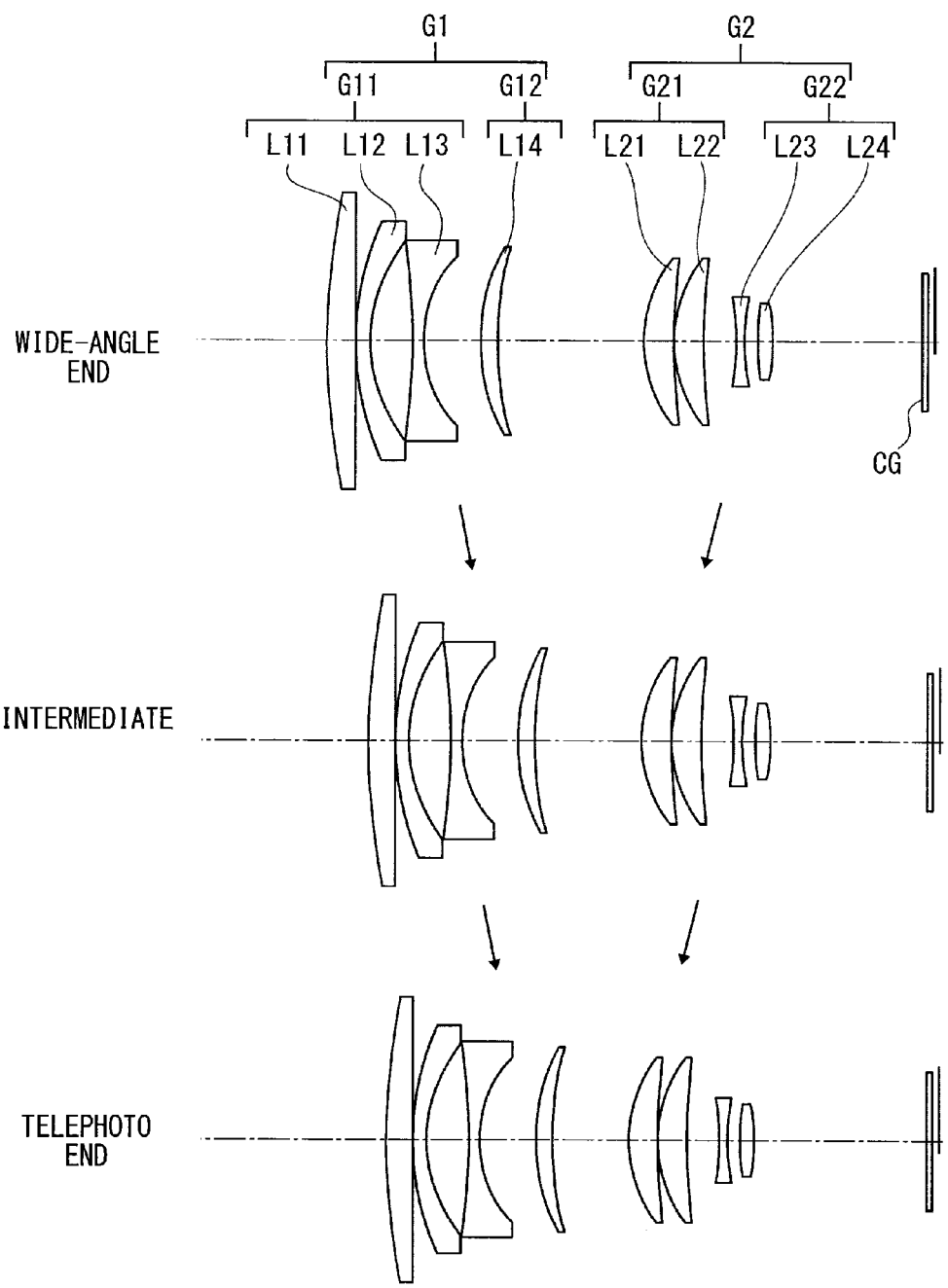
FIG. 5 shows an example of the structure of a projector zoom lens according to a fifth embodiment.

The first rear group G12 comprises one positive meniscus lens having a convex surface on the enlargement side (L12 in FIG. 1, L13 in FIGS. 2, 3 and L14 in FIGS. 4, 5).

The second front group G21 comprises two positive lenses L21, L22 continuously arranged while the second rear group G22 comprises a biconcave lens L23 and a biconvex lens L24 from the enlargement side to the reduction side. The positive lenses L21, L22 are made from the same glass material and have the same surface profile. Thus, the projector zoom lens is comprised of 8 lenses or less.

Further, the projector zoom lens is configured that the lens diameters are decreased stepwise from a most enlargement side lens L11 of the first lens group G1 to a most reduction side lens L24 of the second lens group G2.

When zooming from the wide-angle end to the telephoto end, the first lens group G1 is configured to move to the reduction side and the second lens group G2 is configured to move to the enlargement side.

Thus, the projector zoom lens is a retro-focus type, having the first lens group with negative refractive power on the enlargement side and the second lens group G2 with positive refractive power on the reduction side. Because of this, a long back focus, from a reduction-side surface of the lens L24 of the second lens group G2 to the light bulb, can be secured.

Specifically, the first front group G11 functions to correct distortion and coma aberration while the first rear group G12 functions to converge the light from the first front group G11 although it causes large axial chromatic aberration and chromatic aberration of magnification.

The second front group G21 causes negative axial chromatic aberration and functions to correct positive axial chromatic aberration which occurs on the concave surface of the positive meniscus lens of the first rear group G12. The two positive lenses L21, L22 thereof are made from the same material and have the same surface profile.

Herein, the same surface profile refers to the same lens shape except for lens diameter. That is, the positive lenses L21, L22 can be shaped exactly the same or the lens diameters can be different. Hereinafter, they are referred to as the positive lenses with the same profile.

Thus, the two positive lenses L21, L22 with the same profile made from the same material can increase twice the degree of freedom at which aberrations are corrected and decrease the processing costs. Thereby, the second rear group G22 can easily correct aberrations. The manufacturing costs for the projector zoom lens can be accordingly reduced.

The second rear group G22 functions to reduce aberrations, especially, spherical aberration and distortion caused by the first lens group G1 and second front group G21.

As configured above, the projector zoom lens including 8 lenses or less and exerting angle of view 2ω≈58 degrees at wide-angle end can be realized.

To exert good optical performance, the projector zoom lens according to one embodiment is configured to satisfy the following four conditions:

$$1.0 < |F1/F2| < 1.3 \qquad 1.$$

$$0.0 < |f21/f22| < 0.3 \qquad 2.$$

$$1.1 < F2/f21 < 1.3 \qquad 3.$$

$$2.0 < |D1/D2| < 2.8 \qquad 4.$$

where F1 is a focal length of the first lens group, F2 is a focal length of the second lens group, f21 is a focal length of the second front group, f22 is a focal length of the second rear group, D1 is a moving amount of the first lens group to the reduction side and D2 is a moving amount of the second lens group to the enlargement side when zooming from the wide-angle end to the telephoto end.

The first condition is to balance the negative refractive power of the first lens group and the positive refractive power of the second lens group. With the parameter below the lower limit value, the negative power of the first lens group is relatively strengthened, likely causing a large negative distortion and coma aberration. Meanwhile, with the parameter exceeding the upper limit value, the negative power of the first lens group is relatively weakened, likely causing a large chromatic aberration.

The second condition is to limit the power of the second front and rear groups and effectively suppress distortion, astigmatism, and coma aberration. With the parameter exceeding the upper limit value, a large astigmatism and negative distortion and a large coma aberration at telephoto end are likely to occur. With the parameter below the lower limit value, the power of the second front group becomes too small to perform its functions.

The third condition is to limit the power of the entire second lens group and the second front group, especially to reduce chromatic aberrations. With the parameter exceeding the upper limit value, the power of the second lens group is weakened relative to that of the second front group, likely causing a large chromatic aberration of magnification. With the parameter below the lower limit value, the power of the second front group is weakened relative to that of the second lens group, likely causing a large axial chromatic aberration.

The fourth condition is to limit the moving amounts of the first and second lens groups when zooming. The parameters D1, D2 are positive when the lens groups move from the enlargement side to reduction side. As described above, the first and second lens groups move in opposite directions so that the interval therebetween is shortened, when zooming from the wide-angle end to the telephoto end. It is necessary to properly reduce a variation in aberrations when zooming, limit the moving amounts of the lens groups, and properly divide zooming function to the lens groups.

With the parameter below the lower limit value, the moving amount of the first lens group is relatively decreased or that of the second lens group is relatively increased. That is, the power of the first lens group is strengthened relative to that of the second lens group, unbalancing the power distribution of the first and second lens groups and causing a large distortion and astigmatism.

By forming the first front lens group of the two negative lenses with the same profile made from the same glass material, it is made possible to improving the optical performance of the projector zoom lens. Further, the two negative lenses are continuously arranged, which can reduce the amount of aberration per lens to a half and easily, effectively generate and correct aberrations. Further, they contribute to a reduction in manufacturing costs owing to the commonalization of lens parts.

The two negative lenses of the first front group can be the same lens with the same lens diameter, so can the two positive lenses of the second front group, which can further reduce the manufacturing costs.

Alternatively, these lenses can be made from the same glass material with a difference in curvature radius in a range of 10%, or made from different glass materials and having the same shape, or made from different glass materials with a difference in the shape in a range of 10%. They can exert equivalent optical performance.

Figure 11:
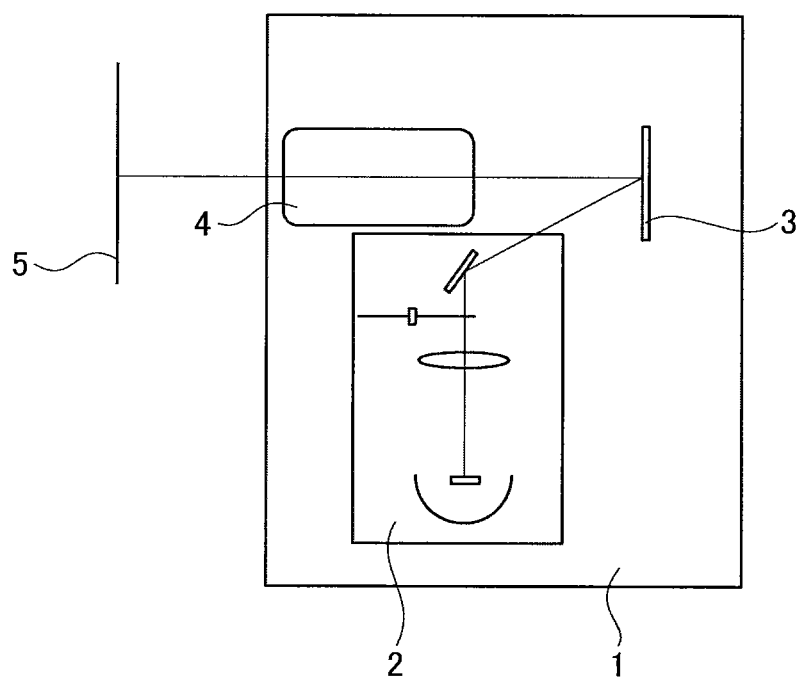
FIG. 11 shows one example of the structure of a projector.

Next, referring to FIG. 11, an example of a projector comprising a light bulb 3 as a micromirror device, DMD is described.

The projector 1 comprises an illumination system 2, a DMD 3, a projector zoom lens 4 according to one of the first to fifth embodiments. The illumination system 2 projects light beams in three RGB colors to the DMD 3 separately with a time interval, to control the inclination of micro mirror elements associated with individual pixels at the timing when each color light beam is projected. Thereby, an image is displayed on an image display element, and the light modulated in intensity by the image is enlarged by the projector zoom lens 4 and projected on a screen 5.

Although not shown, the illumination system 2 comprises a condenser lens, an RGB color wheel, and a mirror, which requires a relatively large space to dispose them. Therefore, the incident angle of light on the DMD 3 from the illumination system needs to be large to some degree, and a long back focus of the projector zoom lens has to be secured. Further, the lens diameter of the lens closest to the DMD 3 needs to be small.

For the purpose of reducing the lens diameter closest to the DMD 3, the projector zoom lens 4 is configured that all the lenses of the first and second lens groups G1, G2 are decreased in diameter stepwise from the enlargement side to the reduction side.

Further, a sufficient back focus of the projector zoom lens can be secured by moving the second lens group to the enlargement side when zooming from the wide-angle end to the telephoto end.

Now, five embodiments of the projector zoom lens are described. Symbols and codes used hereinafter denote as follows:
F: total focal length of lens system
Fno: F-number
R: curvature radius of lens surface (paraxial curvature radius of aspheric surface)
D: interval between two lens surfaces on the axis
Nd: refractive index
Vd: Abbe number The aspheric surface is expressed by the following known formula:

$$X = (H^2/R)/[1+\{1-k(H/r)^2\}^{1/2}] + C4 \cdot H^4 + C6 \cdot H^6 + C8 \cdot H^8 + C10 \cdot H^{10} + \ldots$$

where X is an amount of displacement along the optical axis at a height H relative to a surface apex, H is height from the optical axis, k is a conic constant and $C_4, C_6, C_8, C_{10}, \ldots$ are aspheric coefficients.

First Embodiment

The projector zoom lens according to the first embodiment is shown in FIG. 1. It comprises 6 lenses L11 to L24 grouped into the first and second lens groups G1, G2.

The first front group G11 comprises one negative meniscus lens L11 having a convex surface on the enlargement side while the first rear group G12 comprises one positive meniscus lens L12 having a convex surface on the enlargement side.

The second front group G21 comprises two positive lenses L21, L22 continuously arranged, having a convex surface on the enlargement side while the second rear group G22 comprises a biconcave lens L23 and a biconvex lens L24 with a smallest lens diameter among all the lenses. The positive lenses L21, L22 are made from the same glass material and have the same surface profile.

In the first embodiment the total focal length F of the lens system is 19.7 mm to 25.6 mm, F-number Fno is 2.55 to 2.97, and angle of view 2ω is 59.2 to 46.4 degrees. The following table 1 shows specific data on the optical property of the lenses.

TABLE 1

| SURFACE NUMBER | R | D | Nd | Vd | LENS | GROUP | GROUP |
|---|---|---|---|---|---|---|---|
| 1 | 108.870 | 3.50 | 1.7738 | 47.2 | L11 | G11 | G1 |
| 2* | 17.858 | 26.84 | | | | | |
| 3 | 40.677 | 3.50 | 1.9229 | 20.9 | L12 | G12 | |
| 4 | 49.364 | d4 | | | | | |
| 5 | 22.813 | 7.14 | 1.6180 | 63.4 | L21 | G21 | G2 |
| 6 | 87.988 | 0.10 | | | | | |
| 7 | 22.813 | 7.14 | 1.6180 | 63.4 | L22 | | |
| 8 | 87.988 | 5.14 | | | | | |
| 9 | −45.110 | 1.58 | 1.8211 | 24.1 | L23 | G22 | |
| 10* | 30.130 | 1.17 | | | | | |
| 11 | 66.650 | 6.63 | 1.5891 | 61.3 | L24 | | |
| 12 | −23.658 | d12 | | | | | |
| 13 | — | 1.00 | 1.5168 | 64.2 | CG | | |
| 14 | — | — | | | | | |

Throughout the embodiments, the surface numbers with asterisk in tables are aspheric surfaces. Data on the aspheric surfaces in the first embodiment is as follows.

TABLE 2

| SURFACE NUMBER | K | C4 | C6 | C8 | C10 |
|---|---|---|---|---|---|
| 2 | −0.3497 | −4.6774E−06 | −7.3181E−09 | −1.6602E−11 | −3.9824E−14 |
| 10 | 7.6314 | 2.5045E−05 | −1.8521E−07 | 8.1282E−10 | −3.7046E−11 |

In the tables containing aspheric data as above "−4.6774E−06" denotes "−4.6774*10$^{-6}$", for instance.

In the table 1 d4 and d12 are a variable interval which changes in accordance with a zoom ratio. Variable amounts at projection distance of 2,000 mm are shown in Table 3.

TABLE 3

| | d4 | d12 |
|---|---|---|
| WIDE-ANGLE END | 17.79 | 27.89 |
| INTERMEDIATE | 10.73 | 30.38 |
| TELEPHOTO END | 4.45 | 33.26 |

The values of the parameters in the first to fourth conditions are as follows.

TABLE 4

| |F1/F2| | 1.12 |
|---|---|
| |f21/f22| | 0.16 |
| F2/f21 | 1.29 |
| |D1/D2| | 2.48 |

Figure 6:
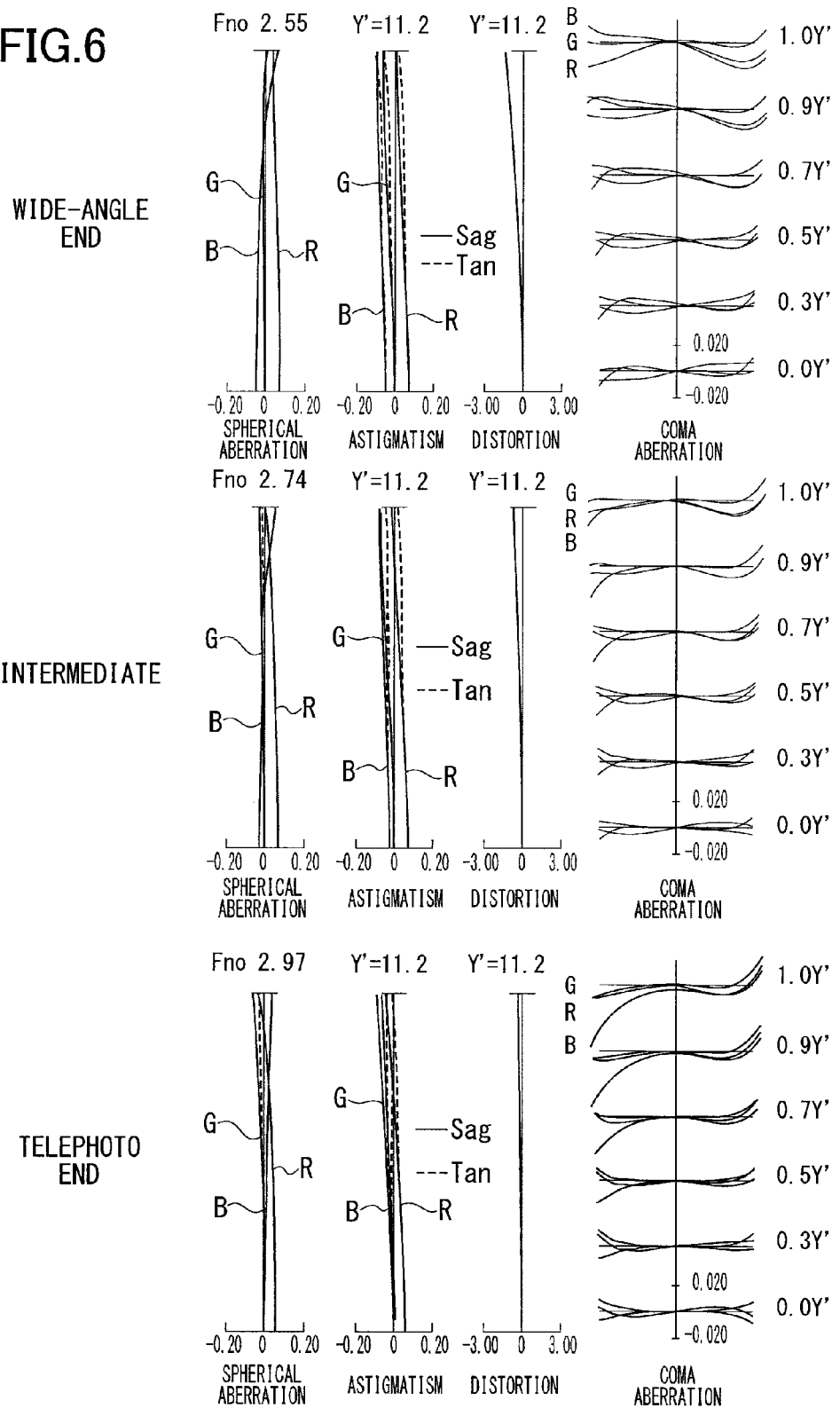
FIG. 6 shows the aberration curves of the projector zoom lens according to the first embodiment.

FIG. 6 shows the spherical aberration, astigmatism, distortion, and coma aberration of the projector zoom lens according to the first embodiment at wide-angle end, intermediate focal length and telephoto end. It is seen from the drawing that the aberrations are properly corrected at each zoom position.

Throughout the embodiments, three wavelengths of RGB colors where R=625 nm, G=550 nm, B=460 nm are evaluated.

Second Embodiment

FIG. 2 shows the projector zoom lens according to the second embodiment which comprises 7 lenses L11 to L24 in order from the enlargement side.

The first front group G11 comprises two negative meniscus lenses L11, L12 each having a convex surface on the enlargement side while the first rear group G12 comprises one positive meniscus lens L13 having a convex surface on the enlargement side. The two negative meniscus lenses L11, L12 are made from the same glass material and have same surface profile.

The second front group G21 comprises two positive meniscus lenses L21, L22 continuously arranged, each having a convex surface on the enlargement side while the second rear group G22 comprises a biconcave lens L23 and a biconvex lens L24 with a smallest lens diameter among all the lenses. The positive meniscus lenses L21, L22 are made from the same glass material and have the same surface profile.

In the second embodiment the total focal length F of the lens system is 19.7 mm to 25.6 mm, F-number Fno is 2.55 to 2.97, and angle of view 2ω is 58.2 to 46.4 degrees. The following table 5 shows specific data on the optical property of the lenses.

TABLE 5

| SURFACE NUMBER | R | D | Nd | Vd | LENS | GROUP | GROUP |
|---|---|---|---|---|---|---|---|
| 1 | 68.999 | 2.50 | 1.5247 | 56.2 | L11 | G11 | G1 |
| 2* | 21.335 | 5.45 | | | | | |
| 3 | 68.999 | 2.50 | 1.5247 | 56.2 | L12 | | |
| 4* | 21.335 | 22.29 | | | | | |
| 5 | 32.901 | 3.33 | 1.9229 | 20.9 | L13 | G12 | |
| 6 | 37.369 | d6 | | | | | |
| 7 | 23.678 | 6.24 | 1.5928 | 68.6 | L21 | G21 | G2 |
| 8 | 127.583 | 0.10 | | | | | |
| 9 | 23.678 | 6.24 | 1.5928 | 68.6 | L22 | | |
| 10 | 127.583 | 5.00 | | | | | |
| 11 | −52.122 | 4.77 | 1.8211 | 24.1 | L23 | G22 | |
| 12* | 36.963 | 3.10 | | | | | |
| 13 | 89.871 | 2.71 | 1.5891 | 61.3 | L24 | | |
| 14 | −25.627 | d14 | | | | | |
| 15 | — | 1.00 | 1.5168 | 64.2 | CG | | |
| 16 | — | — | | | | | |

Data on the aspheric surfaces in Table 5 is as follows.

TABLE 6

| SURFACE NUMBER | K | C4 | C6 | C8 | C10 |
|---|---|---|---|---|---|
| 2 | −0.3766 | 3.2047E−07 | 1.3679E−09 | −8.1645E−12 | 1.2107E−14 |
| 4 | −0.3766 | 3.2047E−07 | 1.3679E−09 | −8.1645E−12 | 1.2107E−14 |
| 12 | 0 | 5.3627E−05 | 4.2601E−08 | 0.0000E+00 | 0.0000E+00 |

Variable amounts at projection distance of 2,000 mm are shown in Table 7.

TABLE 7

| | d6 | d14 |
|---|---|---|
| WIDE-ANGLE END | 16.45 | 27.78 |
| INTERMEDIATE | 9.76 | 30.26 |
| TELEPHOTO END | 3.83 | 33.13 |

The values of the parameters in the first to fourth conditions are shown in Table 8.

TABLE 8

| |F1/F2| | 1.13 |
|---|---|
| |f21/f22| | 0.09 |
| F2/f21 | 1.25 |
| |D1/D2| | 2.39 |

Figure 7:
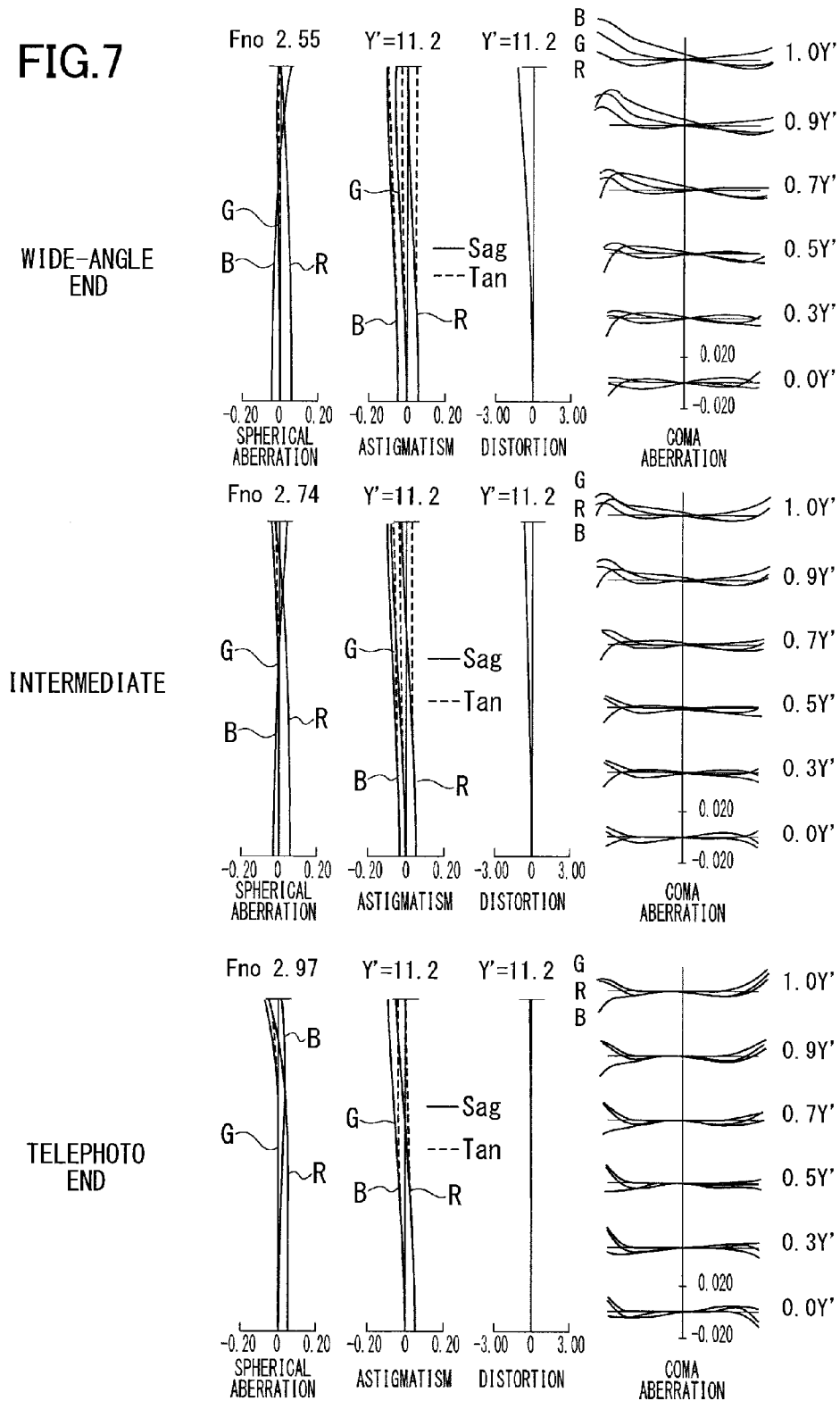
FIG. 7 shows the aberration curves of the projector zoom lens according to the second embodiment.

FIG. 7 shows the aberration curves of the projector zoom lens according to the second embodiment. It is seen from the drawing that the aberrations are properly corrected at each zoom position.

Third Embodiment

FIG. 3 shows the projector zoom lens according to the third embodiment which comprises 7 lenses L11 to L24 from the enlargement side.

The first front group G11 comprises two negative meniscus lenses L11, L12 continuously arranged, each having a convex surface on the enlargement side while the first rear group G12 comprises one positive meniscus lens L13 having a convex surface on the enlargement side. The negative meniscus lenses L21, L22 are made from the same glass material and have the same surface profile.

The second front group G21 comprises two positive meniscus lenses L21, L22 continuously arranged, each having a convex surface on the enlargement side while the second rear group G22 comprises a biconcave lens L23 and a biconvex lens L24 with a smallest lens diameter among all the lenses. The positive meniscus lenses L21, L22 are made from the same glass material and have the same surface profile.

In the third embodiment the total focal length F of the lens system is 19.7 mm to 25.6 mm, F-number Fno is 2.58 to 3.0, and angle of view 2ω is 58.3 to 46.4 degrees. The following table 9 shows specific data on the optical property of the lenses.

TABLE 9

| SURFACE NUMBER | R | D | Nd | Vd | LENS | GROUP | GROUP |
|---|---|---|---|---|---|---|---|
| 1 | 59.236 | 2.50 | 1.5891 | 61.3 | L11 | G11 | G1 |
| 2* | 21.454 | 4.86 | | | | | |
| 3 | 59.236 | 2.50 | 1.5891 | 61.3 | L12 | | |
| 4* | 21.454 | 22.68 | | | | | |
| 5 | 31.496 | 2.00 | 1.9229 | 20.9 | L13 | G12 | |
| 6 | 35.373 | d6 | | | | | |

TABLE 9-continued

| SURFACE NUMBER | R | D | Nd | Vd | LENS | GROUP | GROUP |
|---|---|---|---|---|---|---|---|
| 7 | 24.290 | 6.25 | 1.5928 | 68.6 | L21 | G21 | G2 |
| 8 | 141.933 | 0.10 | | | | | |
| 9 | 24.290 | 6.25 | 1.5928 | 68.6 | L22 | | |
| 10 | 141.933 | 5.00 | | | | | |
| 11 | −53.593 | 5.53 | 1.8211 | 24.1 | L23 | G22 | |
| 12* | 38.111 | 3.32 | | | | | |
| 13 | 90.871 | 2.47 | 1.5891 | 61.3 | L24 | | |
| 14 | −26.321 | d14 | | | | | |
| 15 | — | 1.00 | 1.5168 | 64.2 | CG | | |
| 16 | — | — | | | | | |

Data on the aspheric surfaces in Table 9 is shown in Table 10.

TABLE 10

| SURFACE NUMBER | K | C4 | C6 | C8 | C10 |
|---|---|---|---|---|---|
| 2 | −0.350389 | 2.8052E−07 | 1.3130E−09 | −8.4256E−12 | 1.2944E−14 |
| 4 | −0.350389 | 2.8052E−07 | 1.3130E−09 | −8.4256E−12 | 1.2944E−14 |
| 12 | 0 | 5.0682E−05 | 4.0532E−08 | 0.0000E+00 | 0.0000E+00 |

Variable amounts at projection distance of 2,000 mm are shown in Table 11.

TABLE 11

| | d6 | d14 |
|---|---|---|
| WIDE-ANGLE END | 16.49 | 28.54 |
| INTERMEDIATE | 9.99 | 31.14 |
| TELEPHOTO END | 4.22 | 34.15 |

The values of the parameters in the first to fourth conditions are shown in Table 12.

TABLE 12

| |F1/F2| | 1.07 |
|---|---|
| |f21/f22| | 0.06 |
| F2/f21 | 1.23 |
| |D1/D2| | 2.14 |

Figure 8:
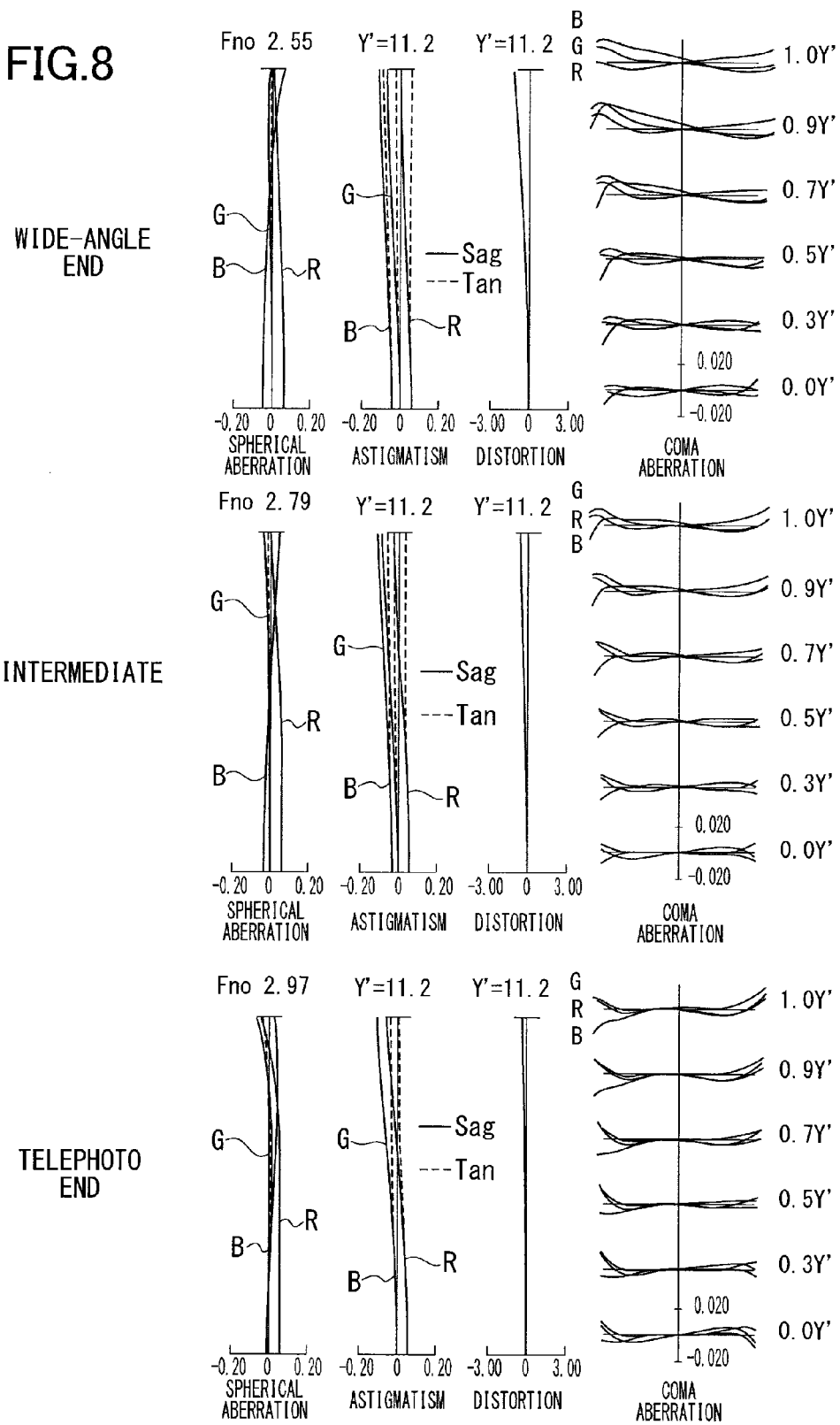
FIG. 8 shows the aberration curves of the projector zoom lens according to the third embodiment.

FIG. 8 shows the aberration curves of the projector zoom lens according to the third embodiment. It is seen from the drawing that the aberrations are properly corrected at each zoom position.

Fourth Embodiment

FIG. 4 shows the projector zoom lens according to the fourth embodiment which comprises 8 lenses L11 to L24 arranged from the enlargement side.

The first front group G11 comprises a positive meniscus lenses L11, a negative meniscus lens L12, and a biconcave lens L13 from the enlargement side while the first rear group G12 comprises one positive meniscus lens L14 having a convex surface on the enlargement side. The positive and negative meniscus lenses L11, L12 each have a convex surface on the enlargement side.

The second front group G21 comprises two positive meniscus lenses L21, L22 continuously arranged, each having a convex surface on the enlargement side while the second rear group G22 comprises a biconcave lens L23 and a biconvex lens L24 with a smallest lens diameter among all the lenses. The positive meniscus lenses L21, L22 are made from the same glass material and have the same surface profile.

In the fourth embodiment the total focal length F of the lens system is 19.7 mm to 25.6 mm, F-number Fno is 2.57 to 2.97 and angle of view 2ω is 58.3 to 46.4 degrees. The following table 13 shows specific data on the optical property of the lenses.

TABLE 13

| SURFACE NUMBER | R | D | Nd | Vd | LENS | GROUP | GROUP |
|---|---|---|---|---|---|---|---|
| 1 | 97.986 | 5.00 | 1.5247 | 56.2 | L11 | G11 | G1 |
| 2 | 1217.955 | 0.10 | | | | | |
| 3 | 48.945 | 2.58 | 1.5247 | 56.2 | L12 | | |
| 4* | 22.675 | 7.85 | | | | | |
| 5 | −126.941 | 2.00 | 1.6477 | 33.8 | L13 | | |
| 6 | 20.830 | 9.79 | | | | | |
| 7 | 34.113 | 3.50 | 1.9229 | 20.9 | L14 | G12 | |
| 8 | 61.031 | d8 | | | | | |
| 9 | 22.488 | 5.28 | 1.6180 | 63.4 | L21 | G21 | G2 |
| 10 | 97.394 | 0.10 | | | | | |
| 11 | 22.488 | 5.28 | 1.6180 | 63.4 | L22 | | |
| 12 | 97.394 | 5.40 | | | | | |
| 13 | −45.451 | 2.51 | 1.8211 | 24.1 | L23 | G22 | |
| 14* | 29.572 | 2.12 | | | | | |
| 15 | 62.743 | 3.39 | 1.6385 | 55.4 | L24 | | |
| 16 | −24.244 | d16 | | | | | |
| 17 | — | 1.00 | 1.5168 | 64.2 | CG | | |
| 18 | — | 0.00 | | | | | |

Data on the aspheric surfaces is shown in Table 14.

TABLE 14

| SURFACE NUMBER | K | C4 | C6 | C8 | C10 | C12 |
|---|---|---|---|---|---|---|
| 4 | 0 | −4.1489E−06 | −3.4819E−09 | −7.3942E−11 | 1.7415E−13 | −5.5094E−16 |
| 14 | 0 | 5.7117E−05 | 0.0000E+00 | 0.0000E+00 | 0.0000E+00 | 0.0000E+00 |

Variable amounts at projection distance of 2,000 mm are shown in Table 15.

TABLE 15

|  | d8 | d16 |
|---|---|---|
| WIDE-ANGLE END | 26.63 | 26.84 |
| INTERMEDIATE | 19.86 | 29.05 |
| TELEPHOTO END | 13.85 | 31.59 |

The values of the parameters in the first to fourth conditions are shown in Table 16.

TABLE 16

| |F1/F2| | 1.28 |
|---|---|
| |f21/f22| | 0.09 |
| F2/f21 | 1.24 |
| |D1/D2| | 2.70 |

Figure 9:
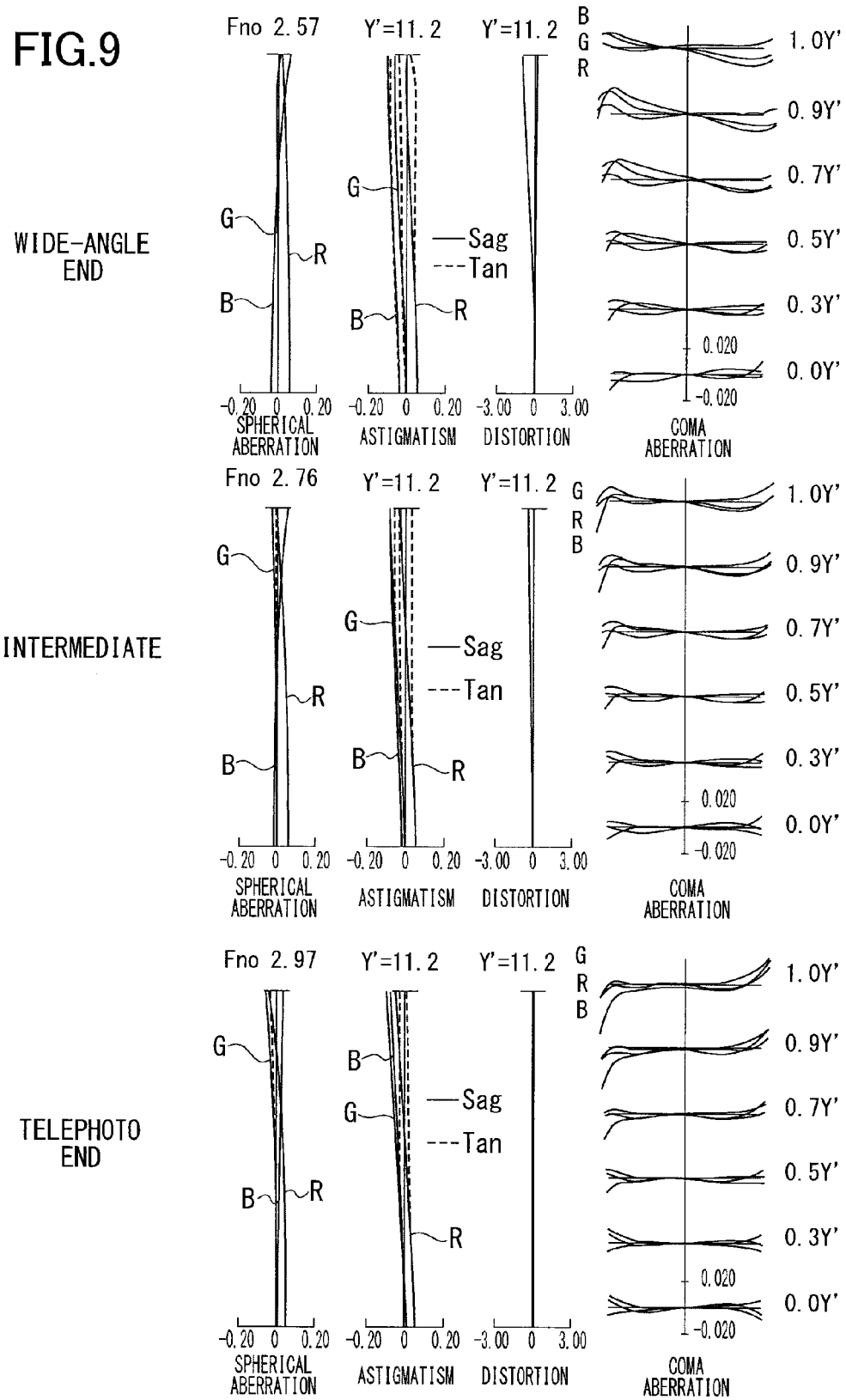
FIG. 9 shows the aberration curves of the projector zoom lens according to the fourth embodiment.
Figure 10:
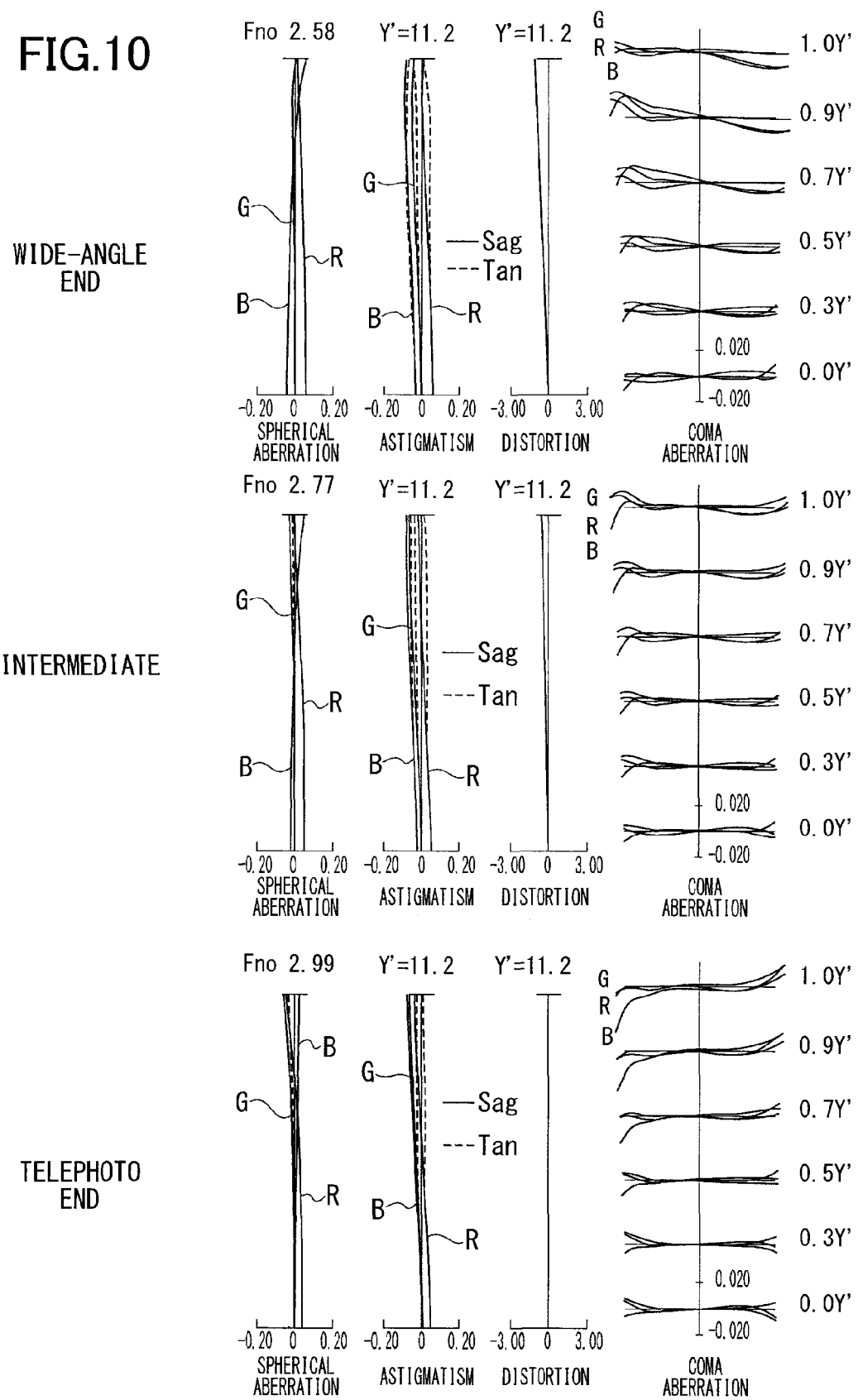
FIG. 10 shows the aberration curves of the projector zoom lens according to the fifth embodiment.

FIG. 9 shows the aberration curves of the projector zoom lens according to the fourth embodiment. It is seen from the drawing that the aberrations are properly corrected at each zoom position.

Fifth Embodiment

FIG. 5 shows the projector zoom lens according to the fifth embodiment which comprises 8 lenses L11 to L24 arranged from the enlargement side.

The first front group G11 comprises a positive meniscus lenses L11, a negative meniscus lens L12, and a biconcave lens L13 from the enlargement side while the first rear group G12 comprises one positive meniscus lens L14 having a convex surface on the enlargement side. The positive and negative meniscus lenses L11, L12 each have a convex surface on the enlargement side.

The second front group G21 comprises two positive meniscus lenses L21, L22 continuously arranged while the second rear group G22 is comprised of a biconcave lens L23 and a biconvex lens L24 with a smallest lens diameter among all the lenses. The positive meniscus lenses L21, L22 are made from the same glass material and have the same surface profile.

In the fifth embodiment the total focal length F of the lens system is 19.7 mm to 25.6 mm, F-number Fno is 2.58 to 2.99, and angle of view 2ω is 58.2 to 46.4 degrees. The following table 17 shows specific data on the optical property of the lenses.

TABLE 17

| SURFACE NUMBER | R | D | Nd | Vd | LENS | GROUP | GROUP |
|---|---|---|---|---|---|---|---|
| 1 | 130.020 | 5.00 | 1.8348 | 42.7 | L11 | G11 | G1 |
| 2 | INF | 0.10 | | | | | |
| 3 | 46.528 | 2.67 | 1.6188 | 63.9 | L12 | | |
| 4* | 24.644 | 7.86 | | | | | |
| 5 | −90.491 | 2.00 | 1.6477 | 33.8 | L13 | | |
| 6 | 20.529 | 10.56 | | | | | |
| 7 | 34.332 | 3.00 | 1.9229 | 20.9 | L14 | G12 | |
| 8 | 57.833 | 26.59 | | | | | |
| 9 | 22.343 | 5.35 | 1.5928 | 68.6 | L21 | G21 | G2 |
| 10 | 92.540 | 0.10 | | | | | |
| 11 | 22.343 | 5.35 | 1.5928 | 68.6 | L22 | | |
| 12 | 92.540 | 6.25 | | | | | |
| 13 | −40.887 | 1.39 | 1.8211 | 24.1 | L23 | G22 | |
| 14* | 38.392 | 2.72 | | | | | |
| 15 | 80.099 | 2.66 | 1.6385 | 55.4 | L24 | | |
| 16 | −23.408 | 27.41 | | | | | |
| 17 | — | 1.00 | 1.5168 | 64.2 | CG | | |
| 17 | — | 0 | | | | | |

Data on the aspheric surfaces in Table 17 is shown in Table 18.

TABLE 18

| SURFACE NUMBER | K | C4 | C6 | C8 | C10 | C12 |
|---|---|---|---|---|---|---|
| 4 | 0 | −3.0148E−06 | −5.9857E−10 | −6.9641E−11 | 1.9627E−13 | −5.2790E−16 |
| 14 | 0 | 6.0332E−05 | 0.0000E+00 | 0.0000E+00 | 0.0000E+00 | 0.0000E+00 |

Variable amounts at projection distance of 2,000 mm are shown in Table 19.

TABLE 19

|  | d6 | d14 |
|---|---|---|
| WIDE-ANGLE END | 25.99 | 27.41 |
| INTERMEDIATE | 19.36 | 29.68 |
| TELEPHOTO END | 13.47 | 32.30 |

The values of the parameters in the first to fourth conditions are shown in Table 20.

TABLE 20

| |F1/F2| | 1.24 |
|---|---|
| |f21/f22| | 0.02 |
| F2/f21 | 1.19 |
| |D1/D2| | 2.56 |

FIG. 9 shows the aberration curves of the projector zoom lens according to the fifth embodiment. It is seen from the drawing that the aberrations are properly corrected at each zoom position.

Table 21 shows the values of the focal length F, F-number Fno, angle of view 2ω and the parameters in the first to fifth embodiments.

TABLE 21

| | | 1st ENBODIMENT | 2nd ENBODIMENT | 3rd ENBODIMENT | 4th ENBODIMENT | 5th ENBODIMENT | LOWER LIMIT | UPPER LIMIT |
|---|---|---|---|---|---|---|---|---|
| F (mm) | WIDE-ANGLE END | 19.7 | 19.7 | 19.7 | 19.7 | 19.7 | | |
| | TELEPHOTO END | 25.6 | 25.6 | 25.6 | 25.6 | 25.6 | | |
| Fno | WIDE-ANGLE END | 2.55 | 2.55 | 2.58 | 2.57 | 2.58 | | |
| | TELEPHOTO END | 2.97 | 2.97 | 3 | 2.97 | 2.99 | | |
| 2ω° | WIDE-ANGLE END | 58.2 | 58.2 | 58.3 | 58.3 | 58.2 | | |
| | TELEPHOTO END | 46.4 | 46.4 | 46.4 | 46.4 | 46.4 | | |
| CONDITION | |F1/F2| | 1.12 | 1.13 | 1.07 | 1.28 | 1.24 | 1.0 | 1.3 |
| | |f21/f22| | 0.16 | 0.10 | 0.06 | 0.09 | 0.02 | 0.0 | 0.2 |
| | F2/f21 | 1.29 | 1.25 | 1.23 | 1.24 | 1.19 | 1.1 | 1.3 |
| | |D1/D2| | 2.48 | 2.39 | 2.14 | 2.70 | 2.56 | 2.0 | 2.8 |

As obvious from the table, the projector zoom lenses according to the above embodiments can correct the aberrations at a high level and sufficiently correct spherical aberrations, astigmatism, curvature of field, chromatic aberration of magnification, and distortion. Also, it realizes zoom ratio of 1.3×.

Further, the compact-size projector zoom lens comprising 8 lenses or less can be realized at low cost.

Further, since the lens diameters are decreased stepwise from the enlargement side to the reduction side, the projector zoom lens is applicable to a micromirror device.

Further, the first lens group is moved to the reduction side and the second lens group is moved to the enlargement side when zooming from the wide-angle end to the telephoto end so that the total lens length will not be elongated during zooming. Thus, the projector zoom lens is compact in size during use.

Accordingly, a compact, high-performance projector incorporating this projector zoom lens can be achieved.

Although the present invention has been described in terms of exemplary embodiments, it is not limited thereto. It should be appreciated that fluctuations may be made in the embodiments described by persons skilled in the art without departing from the scope of the present invention as defined by the following claims.

What is claimed is:

1. A projector zoom lens comprising:
   a first lens group having a negative refractive power, comprising
      a first front group having a negative refractive power and a first rear group having a positive refractive power, comprising a positive meniscus lens with a convex surface on an enlargement side; and
   a second lens group having a positive refractive power, comprising
      a second front group having a positive refractive power, comprising two continuously arranged positive lenses made from a same glass material and having a same surface profile and a second rear group having a negative refractive power, comprising a biconcave lens and a biconvex lens, the lenses of the first and second lens groups being arranged in order from an enlargement side to a reduction side, wherein:
   the projector zoom lens is comprised of 8 lenses or less;
   lens diameters of the first front group, first rear group, second front group, and second rear group are decreased stepwise from a most enlargement-side lens to a most reduction-side lens;
   when zooming from a wide-angle end to a telephoto end, the first lens group is moved towards a reduction side while the second lens group is moved towards an enlargement side; and
      wherein the second lens group is configured to satisfy the following conditions:

$$0.0 < |f21/f22| < 0.2$$

$$1.1 < F2/f21 < 1.3$$

where F2 is a focal length of the second lens group, f21 is a focal length of the second front group, and f22 is a focal length of the second rear group.

2. The projector zoom lens according to claim 1, wherein the first and second lens groups are configured to satisfy the following condition:

$$1.0 < |F1/F2| < 1.3$$

where F1 is a focal length of the first lens group and F2 is a focal length of the second lens group.

3. The projector zoom lens according to claim 1, wherein when zooming from the wide-angle end to the telephoto end, the first and second lens groups are configured to move in a manner to satisfy the following condition:

$$2.0 < |D1/D2| < 2.8$$

where D1 is a moving amount of the first lens group to the reduction side and D2 is a moving amount of the second lens group to the enlargement side.

4. The projector zoom lens according to claim 1, wherein the first front group comprises two negative lenses made from a same glass material and having a same surface profile.

5. The projector zoom lens according to claim 4, wherein the two negative lenses of the first front group have a same outer diameter.

6. The projector zoom lens according to claim 1, wherein the two positive lenses of the second front group have a same outer diameter.

7. A projector comprising:
an image display element;
an illumination system to illuminate the image display element; and
the projector zoom lens according to claim 1, to enlarge an image on the image display element for projection onto a target plane.

8. The projector according to claim 7, wherein the image display element is a micromirror device.

* * * * *